(12) United States Patent
Weinberger (10) Patent No.: US 7,017,970 B2
(45) Date of Patent: Mar. 28, 2006

(54) INPUT DEVICE ON A SUN-VISOR

(75) Inventor: Markus Weinberger, Ingolstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/220,684

(22) PCT Filed: Mar. 5, 2001

(86) PCT No.: PCT/DE01/00818

§ 371 (c)(1),
(2), (4) Date: Dec. 19, 2002

(87) PCT Pub. No.: WO01/64465

PCT Pub. Date: Sep. 7, 2001

(65) Prior Publication Data

US 2003/0151306 A1 Aug. 14, 2003

(30) Foreign Application Priority Data

Mar. 3, 2000 (DE) .............................. 100 10 435

(51) Int. Cl.
*B60J 3/00* (2006.01)
(52) U.S. Cl. .................. 296/97.5; 296/97.6; 296/97.9; 307/10.1
(58) Field of Classification Search ............... 296/97.5, 296/97.6, 97.9; 307/10, 10.1
See application file for complete search history.

(56) References Cited

U.S. PATENT DOCUMENTS

| | | | |
|---|---|---|---|
| 1,469,102 A * | 9/1923 | Olcott ........................ 296/97.9 |
| 4,056,696 A * | 11/1977 | Meyerle et al. ............. 379/419 |
| 4,706,273 A * | 11/1987 | Spear et al. ............. 455/569.2 |
| 4,870,676 A * | 9/1989 | Lewo .......................... 455/564 |
| 4,875,229 A * | 10/1989 | Palett et al. ................ 296/97.5 |
| 5,301,856 A * | 4/1994 | Newsome ................... 296/97.5 |
| 5,555,502 A * | 9/1996 | Opel ........................... 701/36 |
| 5,848,373 A * | 12/1998 | DeLorme et al. ........... 701/200 |
| 5,868,370 A * | 2/1999 | Nivet ......................... 296/97.9 |
| 5,896,915 A * | 4/1999 | Westbrooks et al. ........ 165/11.1 |
| 5,910,882 A * | 6/1999 | Burrell ........................ 361/681 |
| 5,926,087 A * | 7/1999 | Busch et al. ................. 340/438 |
| 5,971,468 A * | 10/1999 | King .......................... 296/97.5 |
| 6,078,825 A * | 6/2000 | Hahn et al. ............. 455/569.2 |
| 6,367,672 B1* | 4/2002 | Lind .......................... 224/245 |
| D466,061 S * | 11/2002 | Samora, Jr. ................ D12/191 |
| 2004/0011835 A1* | 1/2004 | Kim ........................... 224/312 |

FOREIGN PATENT DOCUMENTS

| | | |
|---|---|---|
| DE | 33 16 818 | 11/1984 |
| DE | 297 09 454 | 7/1997 |
| DE | 197 37 322 | 3/1999 |
| DE | 197 39 352 | 3/1999 |
| DE | 198 18 361 | 11/1999 |
| FR | 2 754 217 | 4/1998 |
| JP | 10 297 380 | 11/1998 |
| WO | WO 98 57216 | 12/1998 |
| WO | WO 01 03981 | 1/2001 |

* cited by examiner

*Primary Examiner*—Lori L. Coletta
(74) *Attorney, Agent, or Firm*—Kenyon & Kenyon (57) ABSTRACT

An input device is proposed in a vehicle, the input device having a plurality of keys, being connected to a processing unit and being arranged in the sun visor of the vehicle. The input of text via the input device is simplified, the input device being available in the vehicle without space being necessary, for example, in the center console.

22 Claims, 4 Drawing Sheets

INPUT DEVICE ON A SUN-VISOR

BACKGROUND INFORMATION

The present invention is based on an input device according to the species defined in the main claim. Input devices, for example, for navigation systems in a motor vehicle, are already known, in which letters of the alphabet are input using as few operating elements as possible, and individual alphabetical letters are chosen by a user from a selection of letters. Furthermore, mobile computers (so-called laptops) may be used in the motor vehicle. Such mobile computers have a keyboard, which corresponds in general to the keyboard of a conventional computer, by which text may easily be input, for example, for a route-determination program running on the mobile computer. However, a user must carry the mobile computer along in the vehicle, fix it in position for operation, and take the mobile computer again when leaving the vehicle, or protect it from the view of people looking into the vehicle from the outside, so as not to create a theft incentive.

SUMMARY OF THE INVENTION

In contrast, the input device of the present invention having the features of the main claim has the advantage that, by the arrangement of the input device, a complete keyboard is available for a processing unit disposed in the vehicle, without such an input device having to be introduced by a user, together with an external processing unit, into the vehicle, or without space having to be provided for such an input device in the center console of the vehicle or in the area of a driver or a front-seat passenger.

Advantageous further developments and improvements of the input device indicated in the main claim are rendered possible by the measures specified in the dependent claims. It is particularly advantageous to arrange the sun visor in a holding device in a removable manner, so that a user is able to bring it into a suitable position for an input. If the input device is not needed, it is put again by the user into the holding device, and is protected and kept handy there until the next usage.

Moreover, it is advantageous that the input device is removable from the sun visor, since the function of the sun visor is thus maintained while the input device is being used.

It is also advantageous that the input device is provided with a voltage supply which is independent of the vehicle electrical system, since due to this, it is not necessary that a constant line link exist between the input device and an electrical system of the vehicle. In particular, it is advantageous to arrange a rechargeable current storage, e.g., an storage battery, on the input device, since an exchange of batteries is thereby avoided.

It is further advantageous to provide a wireless exchange of data between the processing unit and the input device, so as to avoid lines between the input device and the processing unit.

Another advantage is to at least arrange keys for the letters of the alphabet on the input device, preferably in an arrangement as on a typewriter or PC keyboard, and/or a numerical character block having numbers from 0 to 9. The user is accustomed to the arrangement of these keys, and is therefore able to adapt quickly to the keyboard disposed in the vehicle, without having to become accustomed to a new keyboard configuration.

Moreover, it is advantageous to implement the keys as membrane keys, since membrane keys rise only very little above a surface, so that when folding the sun visor back against the vehicle roof, keys are not inadvertently pressed. In addition, membrane keys are easy to clean and insensitive to wetness, for example, when used in vehicles whose roof can be opened.

It is furthermore advantageous that data is able to be input via the input device into a driver information device and/or into a navigation device and/or, via a wireless interface, into a Service Node situated outside of the vehicle. It is thereby possible to use the input device, for example, for a contact to the Internet, e.g. for selecting Web sites, or for sending electronic messages.

Moreover, it is advantageous that the input device is able to be concealed by the sun visor, since when concealed, the keyboard is not observable from the outside, and an additional incentive for a thief to break into the car is thereby avoided.

Another advantage is that the sun visor is removable from a holding device, since in this manner, the sun visor may also be used as a keyboard in the vehicle, the keyboard being connected to the processing device either via an air interface or by a cable. In particular, a storage battery disposed in the sun visor permits operation of the sun visor without it having to be connected to a vehicle battery. This permits convenient use of the sun visor both for a front-seat passenger, but also for passengers at other positions in the vehicle. In this case, the sun visor is able to replace a conventional keyboard of a computer, since the backside of the sun visor offers sufficient space for arranging a computer keyboard. The arbitrary arrangement in the vehicle permits a user to hold the sun visor in such a way that convenient input into the input device disposed on the sun visor is possible.

BRIEF DESCRIPTION OF THE DRAWING

Exemplary embodiments of the present invention are shown in the drawing and are explained in detail in the following description.

DESCRIPTION OF THE EXEMPLARY EMBODIMENT

The input device may be used in vehicles of all types, thus, for example, in airplanes, in ships, in railborne vehicles and in motor vehicles. The use in a motor vehicle is described in the exemplary embodiment. A left-hand drive motor vehicle was selected for the description.

Figure 1:
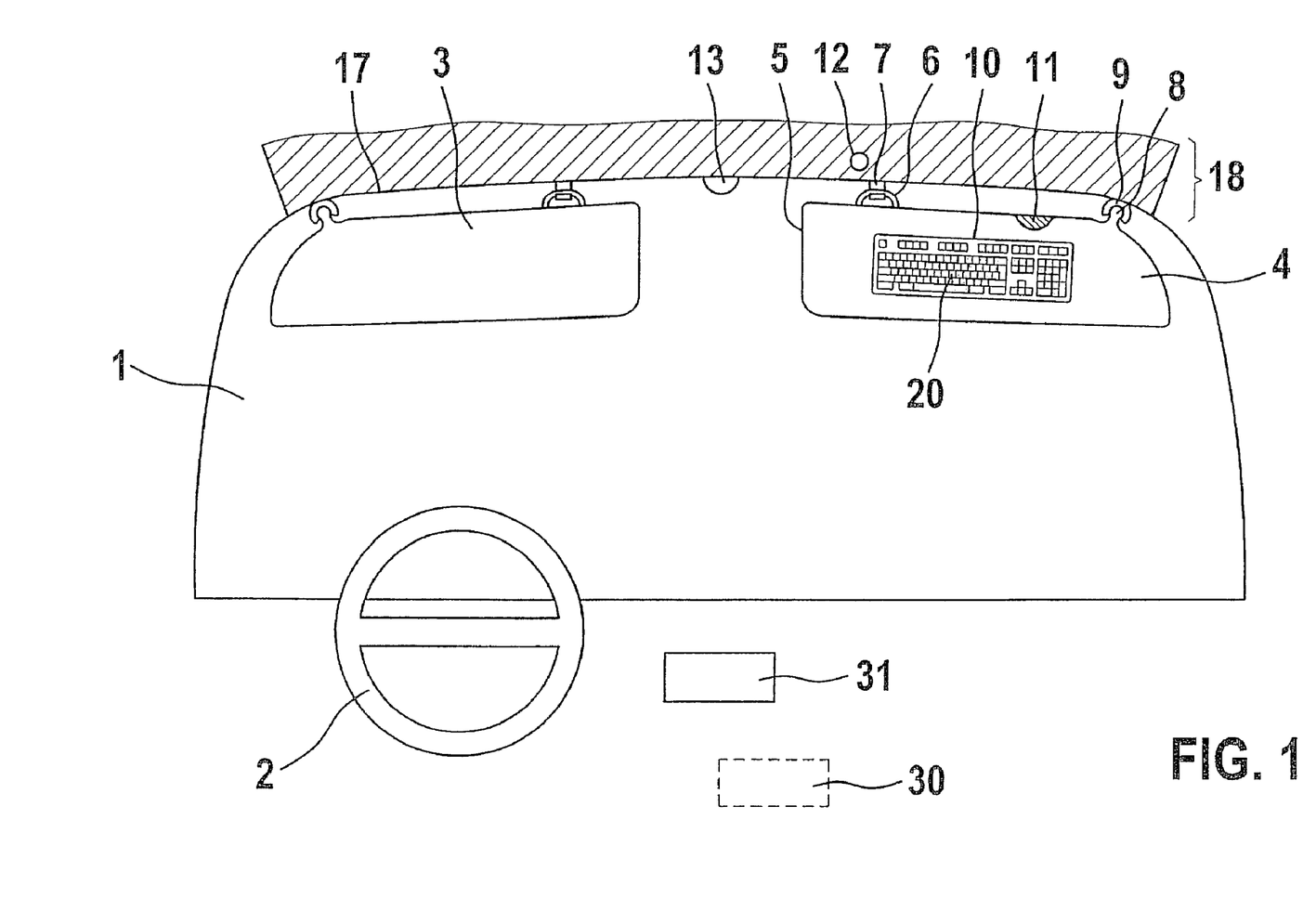
FIG. 1 shows a view of the area in front of a driver and front-seat passenger in a vehicle.

FIG. 1 shows the area in front of a driver and a front-seat passenger in a motor vehicle from the view of the driver and the front-seat passenger. Behind a steering wheel 2, in front of which is located the driving position (not shown in the Figure) of a driver of the motor vehicle, a windshield 1 is arranged in whose upper region a sun visor 3 is disposed in front of the driver. In the view of FIG. 1, located to the right next to the position of the driver is a position of a front-seat passenger. A sun visor 5 is situated in front of the front-seat passenger in an upper region of windshield 1 to the right next to sun visor 3 which is located in front of the driver.

Disposed in sun visor 5 in front of the front-seat passenger is an input device 10 having a keyboard field 20 made of a plurality of keys. Input device 10 is arranged on a side 4 of sun visor 5 turned away from windshield 1. Adjoining an upper edge 17 of windshield 1 is a vehicle roof 18 on which a first holding device 7 and a second holding device 9 are arranged. A first retaining element 6 and a second retaining element 8 of sun visor 5 engage in first holding device 7 and second holding device 9. Furthermore, located in the vicinity of upper edge 17 of windshield 1 is an operating element 12, after whose operation sun visor 5 is releasable from first holding device 7 and second holding device 9. A region 11 of sun visor 5 is used as a passage for a wireless data transmission to a receiver 13, which is preferably arranged in a middle area of upper edge 17 of windshield 1 on vehicle roof 18 adjacent to windshield 1. Positioned in the area of a center console of the vehicle is a display unit 31 which is used as output unit of a processing unit 30 that is arranged at a location in the vehicle not visible for the driver and the front-seat passenger, preferably inside the dashboard. Display unit 31 is preferably a liquid crystal display and, instead of the position in the center console, may also be arranged directly in front of the driver, e.g. next to a speed display, or directly next to the front-seat passenger. Moreover, several displays at various positions in the vehicle are also possible, which are able to be activated depending on the need. In particular the inputs which are entered via keyboard field 20 arranged on input device 10 are displayed in display unit 31. Keyboard field 20 is preferably implemented as a membrane keyboard in which the keyboard field is covered by a membrane, and the membrane is able to be pressed through in the areas of the individual keys, so that pressing in the membrane in the area of a key leads to an activation of the corresponding key. First holding device 7 and second holding device 9 are designed in a manner that sun visor 5 is able to fold against vehicle roof 18, so that windshield 1 is no longer covered by sun visor 5. Preferably a depression for receiving sun visor 5 is provided for sun visor 5 in vehicle roof 18. Instead of in sun visor 5 in front of the front-seat passenger, input device 10 may also be arranged on sun visor 3 in front of the driver or on both sun visors 3, 5. Sun visors 3, 5 are preferably produced from a plastic material. Operating element 12 for releasing the sun visor is preferably designed as a recessed pushbutton which does not rise above vehicle roof 18, so as to avoid inadvertent operation.

After release by an actuation of operating element 12, the sun visor is no longer connected via retaining elements 6, 8, but rather via the wireless data transmission to receiver 13, so that the data entered via input device 10 and keyboard field 20 may be routed to processing unit 30. In this case, a user may position the sun visor in the vehicle in any way desired, so that use is possible not only for the driver or the front-seat passenger, but rather at any other places in the vehicle, as well. A battery, i.e. a storage battery is arranged in sun visor 5 for the power supply.

Figure 2:
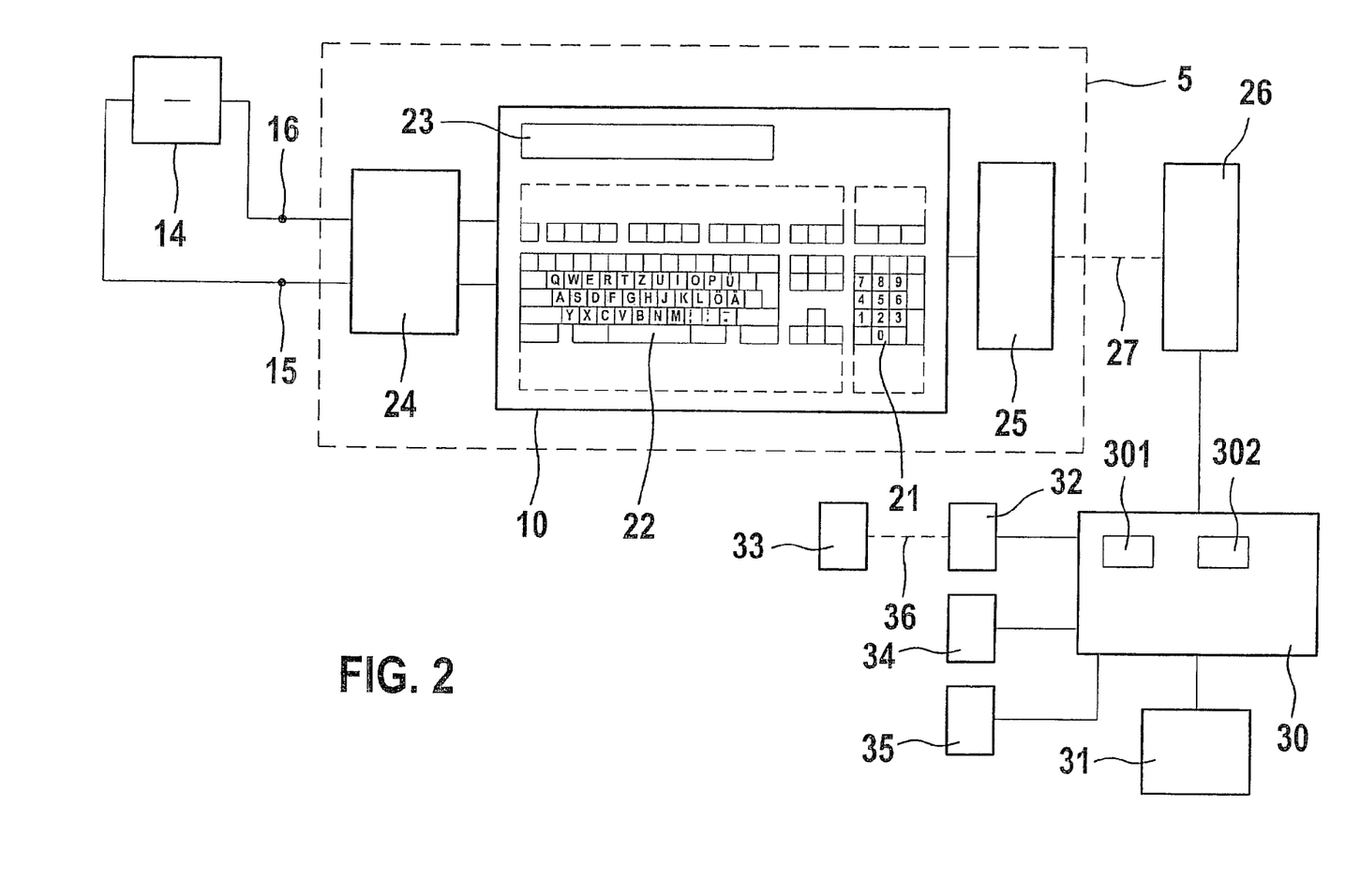
FIG. 2 shows a circuit of the input device in the sun visor to a power supply and to the processing unit.

FIG. 2 shows a circuit arrangement of input device 10 and the surroundings belonging to it. Here and in the following, identical reference numerals also designate the identical elements. Input device 10 is arranged in sun visor 5, which is represented symbolically by a dotted line in FIG. 2. The input device has a first keyboard field 22 which has at least an arrangement of alphabetical letters as is customary on typewriters and/or computer keyboards. The first row of letters begins on the left with the letter sequence "QWERTZ", and alternatively, as is customary for American keyboards, may begin with the letter sequence "QWERTY". First keyboard field 22 may be expanded by function keys and/or by control keys. Input device 10 also has a second keyboard field 21 which has a numerical character block having the numbers from 0 to 9. Using it, in particular number sequences, especially telephone numbers, may easily be input. The configuration in the first keyboard field may be such that the letters from 1 to 9 are arranged in a field including 3 by 3 keys. FIG. 2 shows a configuration in which numerals 7, 8, 9 are arranged in the first row, numerals 4, 5, 6 are arranged in the second row, and numerals 1, 2, 3 are arranged in the third row, and next to the key for "2" in a fourth row is the key for the "0". The row having the keys for numerals 7, 8 and 9 may be exchanged with the row for the numerals 1, 2 and 3. The input device may also be implemented in a manner that either only first keyboard field 22 or second keyboard field 21 is arranged on the input device. An arrangement of an arbitrarily configured keyboard field, or a design as a touch screen are likewise possible. Moreover, input device 10 has a display unit 23 which is preferably designed as a liquid crystal display or as a membrane display, and which is used in particular to directly display to a user his input without him having to turn his eyes to display unit 31. Input device 10 is connected in sun visor 5 to a storage battery 24 and a first transceiver unit 25. Storage battery 24 provides both input device 10 and first transceiver unit 25 with power. Storage battery 24 is connected, via a first contact 15 and a second contact 16, by supply lines to vehicle battery 14, preferably a lead-acid battery, as long as sun visor 5 is in first holding device 7 and second holding device 9. First contact 15 and second contact 16 are preferably disposed in first holding device 7 and first retaining element 6. Alternatively, storage battery 24 may take the form of a non-rechargeable battery. In this case, the electroconductive connections to vehicle battery 14 are omitted. First transceiver 25 is connected to a second transceiver 26 via a wireless connection 27, preferably an infrared or radio link. Second transceiver 26 is in turn connected to processing unit 30. Processing unit 30 has at least one microprocessor 301 and a memory 302. Furthermore, processing unit 30 controls the output in display unit 31. In the exemplary embodiment shown in FIG. 2, processing unit 30 is used as a connection to the Internet, as an on-board computer and as a navigation device. Via a mobile radio interface 32, processing unit 30 is connected by a mobile radio connection 36 to a Service Node 33 which is preferably an internetworking processor to the Internet. Via the Internet, it is possible to send and receive messages in electronic form (e.g. e-mail) and/or to retrieve pages from the World Wide Web (WWW). The position of the vehicle may be determined via a GPS antenna 34 (GPS=Global Positioning System) and routed to processing unit 30. After a travel destination has been input via input device 10 and first keyboard field 22 as well as second keyboard field 21, and has been transmitted to processing unit 30, microprocessor 301 is able to access a digital road map, stored in memory 302, having a stored highway system and route network, and as a function of the determined position and the input travel destination, is able to determine a travel route between the position of the vehicle and the travel destination using the map data. Furthermore, processing unit 30 is able to evaluate vehicle sensors 35, and thus carry out a vehicle diagnostic, for example, with respect to gasoline consumption or for detecting damage to the vehicle.

Figure 3A:
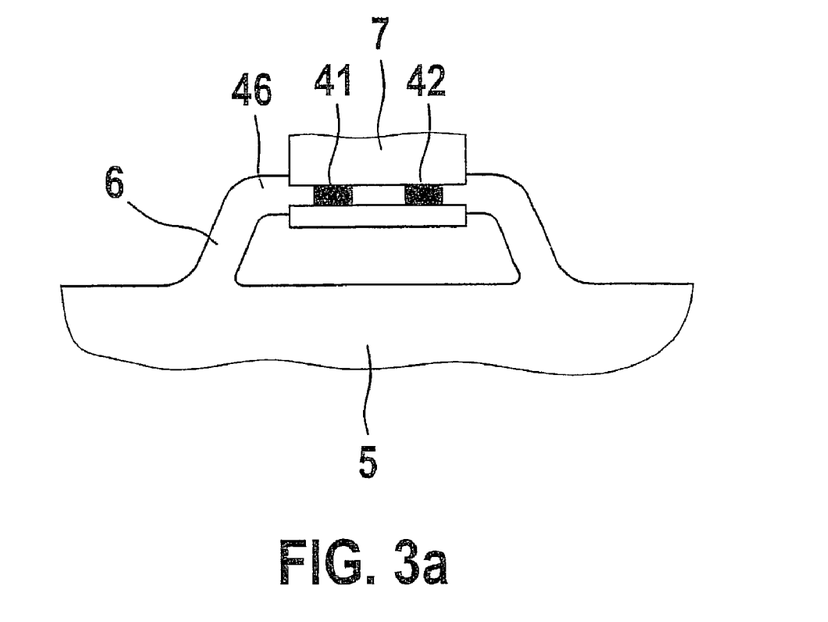
FIGS. 3a and 3b show a holding device for the sun visor.

FIG. 3 shows first retaining element 6 in a first holding device 7. First retaining element 6 has a first metal contact 41 and a second metal content 42. First metal contact 41 and second metal contact 42 are electrically isolated. First metal contact 41 leads to a first terminal of storage battery 24, and second metal contact 42 leads to a second terminal of storage battery 24. First retaining element 6 has a bar 46 having a nearly round cross-section, which is able to be fit into first holding device 7 and is rotatable therein when the position of sun visor 5 is changed between windshield 1 and vehicle roof 18. Second holding device 9 and second retaining element 8 preferably form a ball-and-socket joint, which, upon release of sun visor 5 from first holding device 7, allows rotation of sun visor 5 toward a side window of the vehicle not shown in FIG. 1. In this context, preferably only second holding device 9 may be released using operating element 12. First holding device 7 is to be released manually, so that sun visor 5 is prevented from inadvertently dropping out.

Figure 3B:
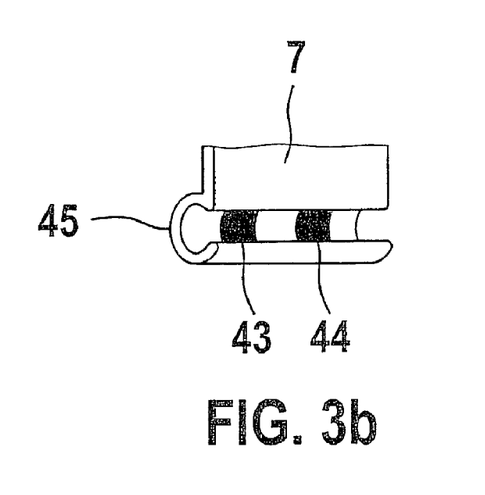

FIG. 3b shows first holding device 7 without first retaining element 6. A round area 45, which otherwise holds first retaining element 6, has a third metal contact 43 and a fourth metal contact 44. Round area 45 is produced from an at least partially elastic material, e.g. a plastic, so that first retaining element 6 may be inserted and snapped into round area 45. Regardless of the position of bar 46 in round area 45, thus regardless of whether the sun visor is folded against windshield 1, against vehicle roof 18, or is in an intermediate position, an electrical contact exists between first metal contact 41 and third metal contact 43, and electrically isolated therefrom, an electrical contact exists between second metal content 42 and fourth metal contact 44. Third metal contact 43 is connected to a first terminal of vehicle battery 14, and fourth metal contact 44 is connected to a second terminal of vehicle battery 14. First metal contact 41 and third metal contact 43 form first contact 15; second metal contact 42 and fourth metal contact 44 form second contact 16.

Figure 4A:
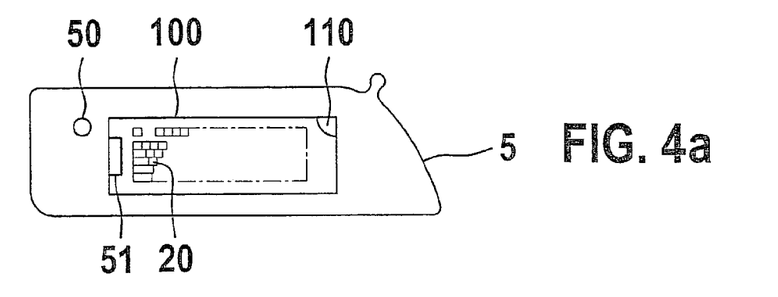
FIGS. 4a and 4b show an exemplary embodiment for an input device removable from the sun visor.

FIG. 4a shows an input device 100, arranged in sun visor 5, which is releasable from sun visor 5 by pressing an operating element 50, preferably a pushbutton. Input device 100 has a grip 51 which the user is able to grasp to conveniently release the input device from the sun visor. For reasons of clarity in the drawing, only a keyboard field 20 is indicated on input device 100 in FIG. 4a. It may be implemented as a second keyboard field 21, a first keyboard field 22, as a combination of first and second keyboard fields 21, 22, or as a differently configured keyboard field. A storage battery 24 and a first transceiver unit are now arranged directly in input device 100, but are not shown in FIG. 4a. A region 110, through which data is transmitted to a second transceiver unit 26, is now disposed directly in input device 100.

Figure 4B:
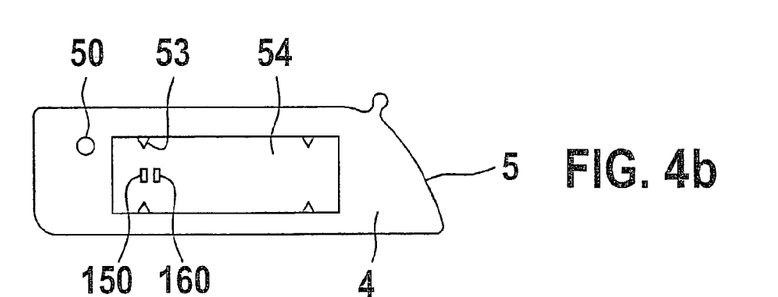

FIG. 4b shows input device 100 released from sun visor 5. In side 4 of sun visor 5 facing away from windshield 1, a depression 54 is now apparent input device 100 was arranged in the depiction according to FIG. 4a. Recognizable in depression 54 are detent hooks 53 which are able to retain input device 100 and which are releasable by actuation of operating element 50. Also located in depression 54 are a first connection 150 and a second connection 160, via which a contact is able to be produced between storage battery 24, arranged in input device 100, and vehicle battery 14.

Figure 5:
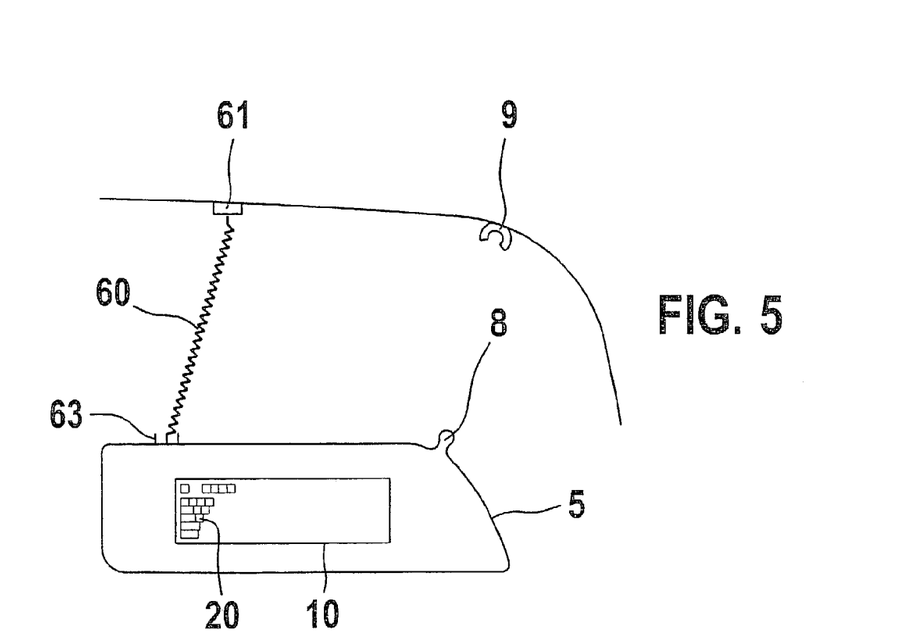
FIG. 5 shows an exemplary embodiment for a connection of the input device in the sun visor via connecting wires.

FIG. 5 shows an exemplary embodiment of input device 10, in which sun visor 5, and with it input device 10, is directly connected via a cable 60 to vehicle battery 14 and processing unit 30. In this case, a first holding device 61 is designed in a manner that upon insertion of sun visor 5 into first holding device 61 and second holding device 9, cable 60, which is either flat or helix-type, is automatically rolled up in a cable coiling device, not shown in the Figure, situated in vehicle roof 18. First retaining element 63 then engages in first holding device 61. A storage battery positioned in sun visor 5 or input device 10 may then be omitted, since a voltage supply is constantly ensured via cable 60. Nevertheless, it is possible to remove the sun visor completely from first holding device 61 and second holding device 9 so that the input device arranged on sun visor 5 may be conveniently used as a keyboard, by a user bringing it into a suitable position, e.g. on a depression in the dashboard provided for that purpose or on the legs of the user.

However, the sun visor remains connected to processing unit 30 and vehicle battery 14, respectively, via cable 60. A plurality of lines for the voltage supply and for the data transmission run through cable 60. In a further exemplary embodiment, cable 60 includes precisely two lines, in which a data-transmission signal is modulated onto the voltage supply.

What is claimed is:

1. An input device in a vehicle in which a sun visor is disposed, comprising:
    a plurality of keys including a subset of keys representing alphabetical letters, each key in the subset representing only a respective one of the alphabetical letters; and
    a connection for connecting to a processing unit, wherein:
        the input device is capable of being arranged on the sun visor,
        the sun visor is capable of being coupled to a holding device connected to a body of the vehicle, and
        for an input using the input device, the sun visor is capable of being completely moved away from the body of the vehicle by being uncoupled from the holding device.

2. The input device as recited in claim 1, wherein:
    the input device is built into the sun visor.

3. The input device as recited in claim 1, wherein:
    the input device is removable from the sun visor.

4. The input device as recited in claim 3, wherein:
    the input device is able to be latched in the sun visor.

5. The input device as recited in claim 1, further comprising:
    a connection to a voltage supply that is independent of a vehicle electrical system.

6. The input device as recited in claim 1, further comprising:
    a connection to a storage battery that is chargeable by a charging current when the sun visor is retained in the holding device.

7. The input device as recited in claim 1, further comprising:
    a connection to a first transceiver unit, wherein:
        the processing unit is connected to a second transceiver unit, and
        data is transmittable wirelessly between the input device and the processing unit via the first transceiver unit and the second transceiver unit.

8. The input device as recited in claim 7,
    wherein the data is transmitted according to one of a radio transmission and an infrared transmission.

9. The input device as recited in claim 1, wherein:
    the connection to the processing unit includes connecting lines.

10. The input device as recited in claim 1, wherein:
    the plurality of keys includes one of keys for letters of the alphabet and keys for whole numbers from zero to nine.

11. The input device as recited in claim 1, wherein:
    the plurality of keys include membrane keys.

12. The input device as recited in claim 1, wherein:
a display unit is arranged at least one of on the input device and on the sun visor.

13. The input device as recited in claim 1, wherein:
by using the input device, data is able to be input into at least one of a driver information device, a navigation device, and into a service node situated outside of the vehicle via a wireless interface.

14. The input device as recited in claim 1, wherein:
the input device is able to be concealed by the sun visor by folding the sun visor against a vehicle roof.

15. A sun visor, comprising:
a body capable of receiving an input device that includes:
  a plurality of keys including a subset of keys representing alphabetical letters, each key in the subset representing only a respective one of the alphabetical letters, and
  a connection for connecting to a processing unit, wherein:
    the input device is capable of being arranged on the sun visor,
    the sun visor is capable of being coupled to a holding device connected to a body of a vehicle, and
    for an input using the input device, the sun visor is capable of being completely moved away from the body of the vehicle by being uncoupled from the holding device.

16. A computer keyboard for mounting on a sun visor of a vehicle, comprising:
a plurality of keys corresponding to all of the letters of the alphabet and to the whole numbers from zero to nine, the plurality of keys including a subset of keys representing the letters of the alphabet, each key in the subset representing only a respective one of the letters of the alphabet; and
a connection for connecting to a processing unit, wherein:
  the computer keyboard is capable of being arranged on the sun visor,
  the sun visor is capable of being coupled to a holding device, and
  for an input using the input device, the sun visor is removable from the holding device.

17. A sun visor, comprising:
a body capable of receiving a computer keyboard and including:
  a coupling element integrally formed on the body and for removably coupling the body to the computer keyboard.

18. The sun visor as recited in claim 17, wherein:
the coupling element includes at least one detent hook.

19. The sun visor as recited in claim 17, wherein:
the body includes a contact via which power is capable of being delivered to the computer keyboard when connected to the body.

20. The sun visor as recited in claim 17, wherein:
the body includes an operating element for causing the coupling element to release the computer keyboard.

21. A computer keyboard for mounting on a sun visor of a vehicle, comprising:
a housing including a grip for permitting a user to grasp the housing in order to release the housing from the sun visor;
a plurality of keys arranged in the housing and corresponding to all of the letters of the alphabet and to the whole numbers from zero to nine; and
a connection arranged in the housing and for connecting to a processing unit, wherein:
  the computer keyboard is capable of being arranged on the sun visor,
  the sun visor is capable of being coupled to a holding device, and
  for an input using the input device, the sun visor is removable from the holding device.

22. The input device as recited in claim 1, wherein:
the input device is capable of controlling a computing device arranged outside of the sun visor and inside the vehicle.

* * * * *

UNITED STATES PATENT AND TRADEMARK OFFICE
CERTIFICATE OF CORRECTION

PATENT NO. : 7,017,970 B2
APPLICATION NO. : 10/220684
DATED : March 28, 2006
INVENTOR(S) : Markus Weinberger It is certified that error appears in the above-identified patent and that said Letters Patent is hereby corrected as shown below:

On the face of the patent, (57) ABSTRACT, line 1, change "vehicle, the input device" to --vehicle, in which the input device--

On the face of the patent, (57) ABSTRACT, line 2, change "having a plurality" to --has a plurality--

On the face of the patent (57) ABSTRACT, line 2, change "being connected to" to --is connected to--

On the face of the patent (57) ABSTRACT, line 3, change "and being arranged" to --and is arranged--

In column 1, line 3, change "BACKGROUND INFORMATION" to --FIELD OF THE INVENTION--

In column 1, lines 5-6, change "input device, according to the species element in the main claim." to --input device.--

In column 1, line 6, insert the heading --BACKGROUND INFORMATION-- and start a new paragraph.

In column 1, line 26, remove "having the features of the main claim."

In column 1, lines 34-36, remove "Advantageous further... the dependent claims."

In column 2, line 27, change "... OF THE DRAWING" to --... OF THE DRAWINGS--

In column 2, lines 36-38, remove "Exemplary embodiments... following description."

In column 2, line 40, change "in a vehicle;" to --in a vehicle.--

In column 2, line 42, change "the processing unit;" to --the processing unit.--

UNITED STATES PATENT AND TRADEMARK OFFICE
CERTIFICATE OF CORRECTION

PATENT NO. : 7,017,970 B2  
APPLICATION NO. : 10/220684  
DATED : March 28, 2006  
INVENTOR(S) : Markus Weinberger Page 2 of 2

It is certified that error appears in the above-identified patent and that said Letters Patent is hereby corrected as shown below:

In column 2, line 43, change "FIGS. 3*a* and 3*b* show" to --FIG. 3*a* shows a first view of--

In column 2, line 43, change "for the sun visor;" to --for the sun visor.--

Insert into column 2, line 43 --FIG. 3*b* shows a second view of a holding device for the sun visor.--

In column 2, line 44, change "FIGS. 4*a* and 4*b* show" to --FIG. 4*a* shows a first view of--

In column 2, line 45, change "from the sun visor; and" to --from the sun visor.--

In column 2, line 45, insert --FIG. 4*b* shows a second view of an exemplary embodiment of an input device removable from the sun visor.--

In column 2, lines 48-49, change "DESCRIPTION OF THE EXEMPLARY EMBODIMENT" to --DETAILED DESCRIPTION--

Signed and Sealed this

Twentieth Day of February, 2007

JON W. DUDAS  
*Director of the United States Patent and Trademark Office*